United States Patent [19]
Engdahl

[11] 3,772,879
[45] Nov. 20, 1973

[54] HEAT ENGINE
[75] Inventor: Richard E. Engdahl, Danbury, Conn.
[73] Assignee: Energy Research Corporation, Bethel, Conn.
[22] Filed: Aug. 4, 1971
[21] Appl. No.: 168,865

[52] U.S. Cl. .................................................. 60/37
[51] Int. Cl. ........................................... F01k 25/08
[58] Field of Search .................. 123/1 A; 60/36, 37

[56] References Cited
UNITED STATES PATENTS
| | | | |
|---|---|---|---|
| 2,648,317 | 8/1953 | Mikulasek | 123/1 A |
| 2,988,430 | 6/1961 | Horner | 60/36 X |
| 2,988,431 | 6/1961 | Kresse et al. | 60/36 X |

FOREIGN PATENTS OR APPLICATIONS
| | | | |
|---|---|---|---|
| 19,356 | 9/1934 | Australia | 60/36 |

*Primary Examiner*—Martin P. Schwadron
*Assistant Examiner*—Allen M. Ostrager
*Attorney*—Richard D. Mason et al.

[57] ABSTRACT

A pollution-free heat engine using a working fluid containing ammonia, including first means for heating and pressurizing the working fluid to a level of temperature and pressure whereat chemical dissociation or cracking of the ammonia into nitrogen and hydrogen takes place. Second means is provided for burning at least a portion of said cracked hydrogen as fuel for supplying part of the heat required in said first means.

29 Claims, 3 Drawing Figures

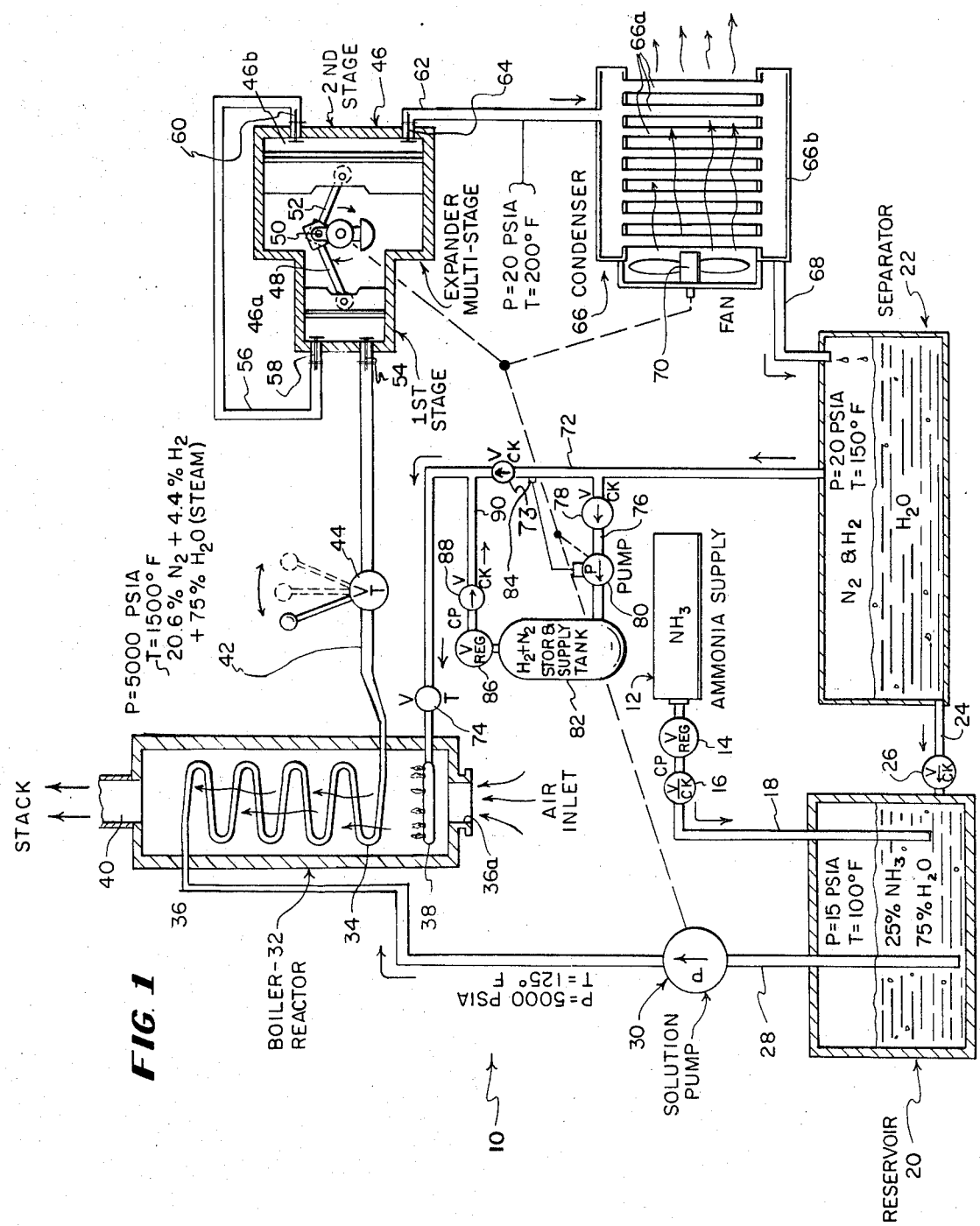

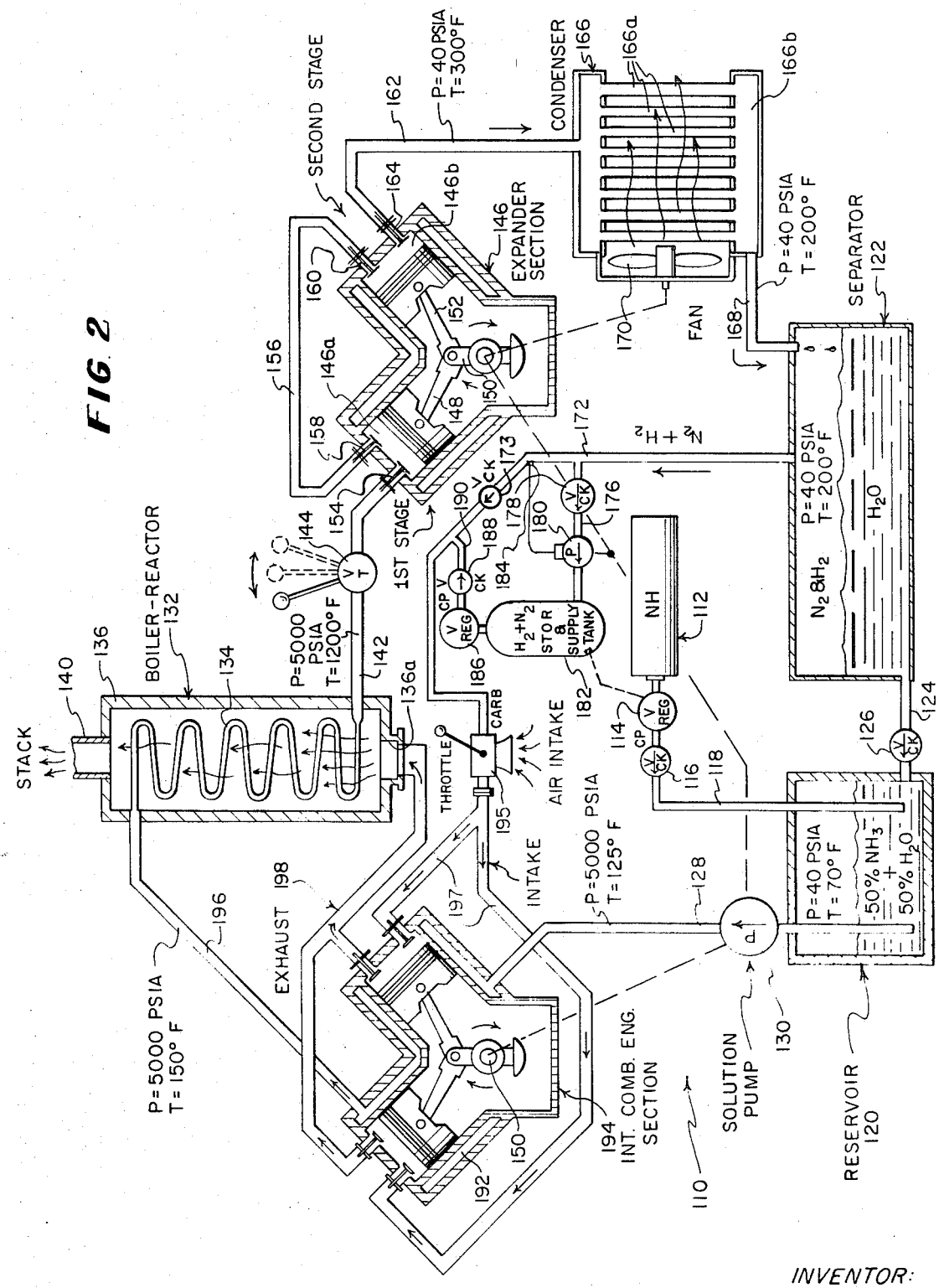

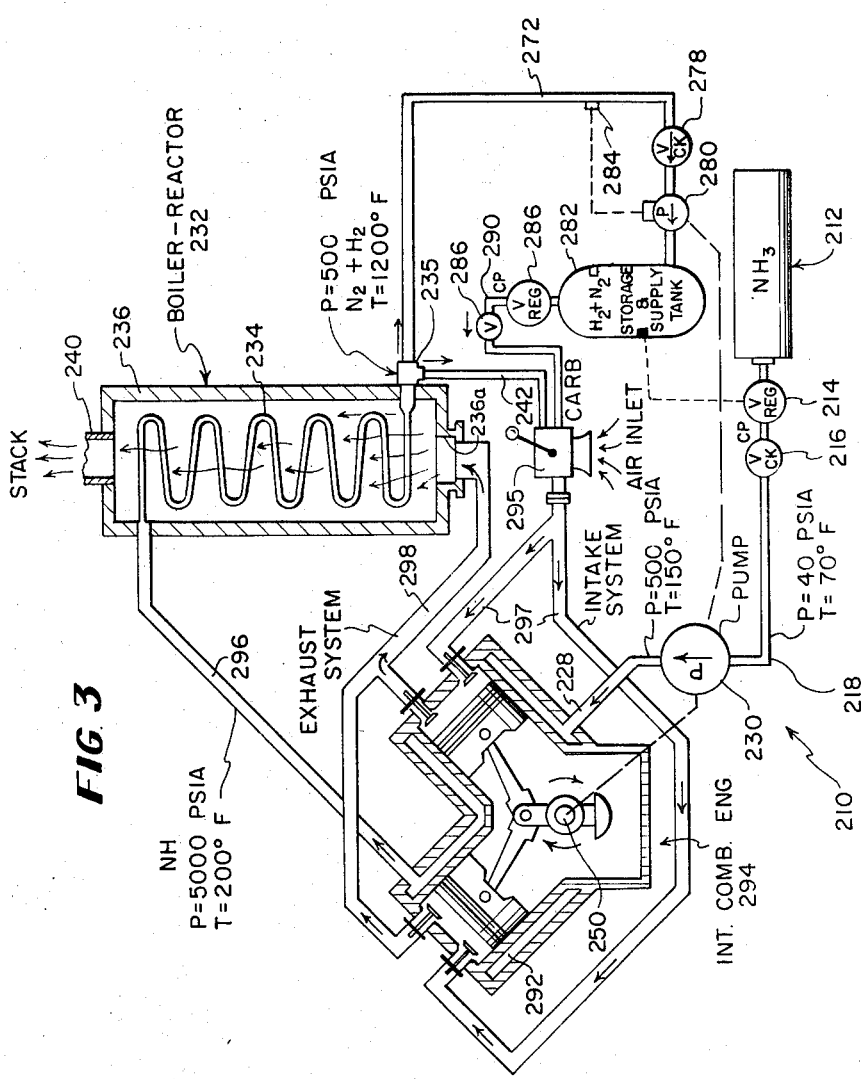

HEAT ENGINE

The present invention is directed to a new and improved heat engine which utilizes a working fluid containing ammonia and, more particularly, the engine provides means whereby the working fluid is elevated in temperature and pressure to a level whereat cracking or chemical dissociation of the ammonia into nitrogen and hydrogen takes place. At least a portion of the cracked hydrogen gas is burned to supply heat for elevating the temperature and pressure of the working fluid, and the nitrogen (being relatively inert) does not recombine into oxides of nitrogen which contribute to pollution.

It is therefore an object of the present invention to provide a new and improved heat engine which is substantially pollution-free in terms of oxides of carbon and nitrogen.

Another object of the present invention is to provide a new and improved heat engine which utilizes a working fluid containing ammonia and provides means for chemically dissociating or cracking the ammonia into nitrogen and hydrogen, at least some of the hydrogen being burned to supply heat for the cracking process.

Another object of the present invention is to provide a new and improved heat engine of the character described which approaches a cycle of operation similar to the ideal Rankine cycle, modified however by the fact that the working fluid undergoes chemical dissociation or cracking, and one of the cracked components is utilized as a fuel source for the engine.

Still another object of the present invention is to provide a new and improved heat engine of the character described in which the cracked component of nitrogen gas does not recombine with oxygen or hydrogen and can be exhausted to the atmosphere without significant pollution effect.

Another object of the present invention is to provide a new and improved heat engine of the character described tuilizing utilizing working fluid containing ammonia and water.

Another object of the present invention is to provide a new and improved heat engine of the character described employing an internal combustion process and utilizing ammonia as a fuel.

Another object of the present invention is to provide a new and improved internal combustion engine of the character described in the preceding paragraph which operates in a manner whereby the ammonia is chemically dissociated and hydrogen gas therefrom is used as a source of fuel for the engine.

The foregoing and other objects and advantages of the present invention are accomplished in one of the illustrated embodiments herein comprising a heat engine using a working fluid containing ammonia and provided with first means for heating and pressurizing the working fluid to a temperature and pressure level whereat chemical dissociation or cracking of the ammonia into nitrogen and hydrogen takes place. At least a portion of the cracked hydrogen is used as a fuel to provide heat for the chemical dissociation or cracking of the ammonia into hydrogen and nitrogen. The engine includes an expander wherein the working fluid entering at elevated temperature and pressure is expanded to do useful work and the engine includes a condenser means for condensing the expanded working fluid. A storage tank is provided for the nitrogen and hydrogen gas, and means is provided for supplying gas from the tank for use as a fuel to supply heat for the cracking process.

For a better understanding of the invention, reference should be had to the following detailed description taken in conjunction with the drawings, in which:

FIG. 1 is a schematic diagram illustrating a heat engine in accordance with the features of the present invention;

FIG. 2 is a schematic diagram of a modified form of heat engine in accordance with the invention, using a different operating cycle including an internal combustion process; and FIG. 3 is a schematic diagram of yet another modified form of heat engine, in accordance with the present invention, using a still different operating cycle and ammonia as fuel.

Referring now, more particularly, to the drawings and the embodiment illustrated in FIG. 1, a heat engine 10 is therein shown which utilizes a working fluid of aqueous ammonia and is constructed in accordance with the features of the present invention. Ammonia is supplied from a high pressure storage tank 12 through a storage tank pressure regulating valve 14, a check valve 16, and a conduit 18 into a reservoir 20 which contains a solution of approximately 25 percent ammonia and 75 percent water under a pressure of approximately 15 psia and a temperature of approximately 100° F. Water for the solution in the reservoir 20 is supplied from a separator tank 22 via a conduit 24 and a check valve 26. Aqueous ammonia from the reservoir 20 in a three-to-one ratio of water to ammonia is pumped through a conduit 28 by means of a high pressure pump 30 to a boiler-reactor, indicated generally by the numeral 32. The pump 30 increases the pressure of the aqueous ammonia working fluid to approximately 5,000 psia and the temperature is raised to approximately 125° F. in the pumping process.

The high pressure, aqueous ammonia working fluid enters the boiler-reactor 32 and flows through a heat transfer coil 34 comprising a plurality of turns with a relatively large surface area to provide good heat transfer for elevating the temperature of the working fluid. The boiler-reactor 32 includes an insulated outer shell or casing 36 and a burner 38 adjacent one end for supplying heat to the working fluid as it flows through the heat transfer coil 34. An opening 36a is provided adjacent the burner for supplying combustion air, and the products of combustion pass over and around the heat transfer coil 34 which is preferably formed of a strong, heat resistant metal, such as "inconel" or stainless steel, capable of withstanding the extremely high pressures and temperatures involved. The products of combustion from the boiler-reactor are passed out through an exhaust stack 40 at one end of the boiler-reactor housing 36.

As the working fluid flows through the heat transfer coil 34, the temperature of the fluid is raised to approximately 1,500° F. and the pressure remains relatively constant at approximately 5,000 psia. The elevation in temperature causes the water in the working fluid to flash into superheated steam and, at the same time, the ammonia is chemically dissociated or cracked into gaseous nitrogen and hydrogen.

The working fluid mixture of steam, ammonia, hydrogen, and nitrogen leaves the heat exchanger coil 34 through a conduit 42 and passes through a throttle control valve 44 or variable admission angle control into a multistage expander, generally indicated by the reference numeral 46. The working fluid mixture in the conduit 42 contains approximately 20.6 percent nitrogen gas by weight and 4.4 percent hydrogen gas by weight plus 75 percent water in the form of super-heated steam. The expander 46 is shown in schematic form only and may take various physical forms, such as a radial array of cylinders, a plurality of cylinders in an in-line or V-type array, or a vane-type rotary expander. The main requirement of the multistage expander is to provide a wide enough range of expansion to utilize the available energy contained in the high pressure, high temperature working fluid entering the expander through the conduit 42.

In the expander 46, one or more high pressure working cylinders 46a are provided with reciprocal pistons therein which are connected via connecting rods 48 to a common crankshaft 50. Connecting rods 58 are provided to connect one or more larger pistons which are slidable in larger low pressure expansion cylinders 46b. The working fluid enters the high pressure side of the expander through a valve 54 and passes from the high pressure stage through an intermediate conduit 56 and engine operated and timed to piston position valve 58 through a engine operated and timed to piston position valve 60 into the low pressure expanding cylinders 46b. Spent fluid exits the low pressure cylinders via a conduit 62 and engine operated and timed to piston position valve 64.

The incoming working fluid entering the multistage expander 46 is supplied at a pressure of approximately 5,000 psia and at a temperature of approximately 1,500° F. After expansion of the fluid in the high and low pressure stages of the expander, the fluid flows out through the exhaust conduit 62 at a pressure of approximately 20 psia and a temperature of approximately 200° F. It will thus be seen that a large quantity of work output is obtained during the expansion of the working fluid in the multistage expander 46 and this work is available at the rotating shaft 150. The crankshaft of the expander may be used to drive the high pressure pump 30, as indicated by the dotted lines in the drawing, and thus the pump may serve as a metering pump for supplying fluid to the system at the desired rate as measured by the work output of the engine in the expander stage.

Even though the working fluid undergoes a large pressure and temperature drop as it passes through the expander 46, the nitrogen and hydrogen gas, which has been dissociated or chemically cracked from the ammonia in the boiler-reactor 32, does not recombine and the gases are retained in separated form.

The working fluid in the exhaust conduit 62 from the second stage of the expander passes into a condenser, generally indicated at 66. In the condenser 66, the working fluid passes through a plurality of air-cooled, finned tubes 66a, and the temperature of the fluid is reduced to approximately 150° F. The condensed water, ammonia, and the nitrogen and hydrogen collect in the sump portion 66b of the condenser and are directed into the separator tank 22 through a conduit 68. Airflow is directed over the condenser tubes 66a by a fan 70 and the fan may be driven by the output shaft of the work expander, as indicated by the dotted lines in the drawing.

In the separator 22, the liquid settles to the bottom and the nitrogen and hydrogen gas fills the space above the upper level of liquid. The gaseous nitrogen is relatively chemically inert and does not readily combine with oxygen or recombine with the gaseous hydrogen to reform ammonia. The collected gases pass through a conduit 72, check valve 73, and a throttling valve 74 into the burner 38 in the boiler-reactor 32, and the hydrogen gas is burned (forming water-vapor) for supplying heat to the working fluid passing through the heat exchange coil 34.

No significant oxides of nitrogen are produced in the burning process within the boiler-reactor 32 and the stack gases passing out the exhaust stack 40 consist of water-vapor and gaseous nitrogen, with little, if any, traceable quantities of oxides of nitrogen, carbon monoxide and carbon dioxide.

In order to supply fuel for initially starting up the engine 10 or for larger power increases, an immediately available supply of fuel is required. For this purpose some of the hydrogen and nitrogen gas from the conduit 72 is passed through a branch conduit 76 and check valve 78 into a pump 80 which delivers the gas to a storage tank 82. The pressure of the gas in the tank 82 is maintained by a sensor 84 and this sensor electrically controls the pump to operate when needed. Gas from the tank may be supplied to the burner 38 when required, through a constant pressure regulator valve 86, a check valve 88, and branch conduit 90 into the conduit 72.

The heat engine 10 provides many advantages over present day engines and the operating cycles thereof. The engine 10 has an inherent, high efficiency operating cycle which approaches the ideal Rankine cycle but elimiates the problem of freezing of the working fluid, because of the use of aqueous ammonia rather than water alone. The upper temperature in the cycle is limited only by the strength and temperature limits of the materials used in the boiler-reactor 32 and in the other portions of the system which are exposed to the high temperature, high pressure working fluid. In a pure steam engine, the composition of the working fluid itself limits the maximum pressures and temperatures, but in the engine 10, using aqueous ammonia instead of water, higher maximum temperatures and pressures are obtainable and higher efficiencies are achieved. In addition, the engine 10 burns the cracked hydrogen gas as a fuel, and this fuel is supplied from the chemical cracking process in the boiler-reactor 32, where the gas is dissociated from the ammonia of the working fluid. No oxides of carbon are produced or passed to the atmosphere through the stack. Because of the high temperature and pressures involved, the boiler-reactor, expander, condenser, and reservoir and separator can be of relatively small size, yet a high power output can be produced. Moreover, the operating parameters of pressure and temperature may be higher as noted, as the thermal efficiency of the engine approaches an ideal Rankine cycle and may reach approximately 36 percent, which is considerably higher than the efficiency of internal combustion engines and steam engines presently available.

Referring now, more particularly, to FIG. 2, therein is illustrated a modified form of heat engine constructed in accordance with the features of the present invention and referred to generally by the reference numeral 110. Ammonia is supplied to the engine from a pressure tank 112, a constant pressure regulator valve 114, a check valve 116, and a conduit 118 which leads into a reservoir 120. Water is introduced into the reservoir 120 from a separator tank 122 via a conduit 124 and check valve 126. An aqueous ammonia solution is formed in the reservoir 20 and the pressure therein is maintained at approximately 40 psia with a temperature of approximately 70° F. The ammonia and water, about half and half by weight, comprises the working fluid and is drawn from the reservoir 120 through a conduit 128 by a fluid pump 130, which increases the pressure of the working fluid to approximately 5,000 psia at a temperature of approximately 125° F. The working fluid is then passed through a cylinder jacket cooling system 192 formed around one or more banks of cylinders in an internal combustion engine, generally referred to by the reference numeral 194.

After passage through the cooling system 192 of the internal combustion engine, the working fluid is directed via a conduit 196 into a heat exchanger coil 134 in a boiler-reactor vessel, generally indicated as 132. The working fluid entering the boiler-reactor is at a pressure of approximately 5,000 psia and a temperature of 150° F., and as it passes through the plurality of turns in the heat exchanger coil 134, the temperature of the fluid is elevated until cracking or chemical dissociation of the ammonia into hydrogen and nitrogen gas takes place and the water is flashed into superheated steam. The chemically dissociated working fluid (comprising steam, ammonia, nitrogen and hydrogen) is passed from the heat exchanger coil 134 in the boiler-reactor 132 through a conduit 142 and throttle control valve 144 or variable admission angle control into the first stage of a multistage expander 146. As previously described in connection with the expander 46 of the heat engine 10, the expander 146 may take on a variety of physical embodiments, and the illustration shown is by way of example only. The first or high pressure stage of the expander may comprise one or more high pressure cylinders 146a having reciprocating pistons therein and connected by connecting rods 148 to a common crankshaft 150. A second, low pressure stage, comprising one or more cylinders 146b having pistons connected to the crankshaft 150 by connecting rods 152 is provided for a final stage of expansion of the working fluid.

The boiler-reactor 132 is enclosed in an insulated outer jacket 136 and an inlet opening 136a is provided at one end for the entry of hot gases from the exhaust manifold system 198 of the internal combustion engine 194. These high temperature exhaust gases from the internal combustion engine 194 are utilized in the boiler-reactor 132 for elevating the temperature of the working fluid to a level whereat cracking of the ammonia into nitrogen and hydrogen gas and flashing of the water and steam into superheated steam take place.

After the hot exhaust gases flow over and around the coils of the heat exchanger 134, they pass out through a stack 140 at the opposite end of the boiler-reactor vessel. The exhaust gases contain water and nitrogen, but have no carbon monoxide or carbon dioxide therein and little, if any, oxides of nitrogen.

The working fluid at elevated pressure and temperature leaving the coil 134 passes through the throttle valve 144 into the multistage expander 146 and flows through a timed from piston position valve 154 into the first stage cylinders 146a. After high pressure expansion, the fluid passes through a timed from piston position valve 158 via a conduit 156 leading to the second stage cylinders 146b of the expander. The expanded fluid passes from the expansion cylinders 146b via an exhaust conduit 162 and a timed from piston position valve 164 into a condenser 166. After expansion, the working fluid, consisting of water plus nitrogen and hydrogen gas, is reduced in pressure to approximately 40 psia and in temperature to approximately 300° F. as it enters the condenser 166 for further cooling. The working fluid passes through the air-cooled, finned tubes 166a and airflow is supplied by a fan 170 which preferably may be driven by the crankshaft 150 (as indicated by the dotted lines on the diagram) of the multistage expander 146.

Cooling of the working fluid in the condenser 166 lowers the temperature to approximately 200° F., and the liquid and gas collect in the lower sump 166b for passage via a conduit 168 into the separator vessel 122. In addition to the work output obtained from the expanding working fluid in the expander 146, the internal combustion engine 194 also provides an additional source of power which is usable in a variety of different applications. The internal combustion engine 194 and the multistage expander 146 may be part of a common engine block, and both sections may deliver power to a common rotating crankshaft 150 (as shown by the connected dotted lines). The shaft 150 also may drive the solution pump 130, the fan 170, and a gas pump 180 used for filling the gas storage tank 182.

The condensed water collects in the bottom half of the separator vessel 122 and the chemically dissociated or cracked out nitrogen and hydrogen gases occupy the space above the level of the water. The gas flows through a supply conduit 172 into a carburetor 195 which is adapted to proportion outside air with the gas for delivery of a combustible mixture thereof to the cylinders of the internal combustion engine 194 through an intake manifold system indicated by the reference numeral 197.

As previously described, the exhaust gases leaving the cylinders of the internal combustion engine 194 are delivered via an exhaust manifold system 198 into the inlet opening 136a in the boiler-reactor 132 for heating the working fluid to a superheated cracking temperature. The internal combustion engine portion 194 of the heat engine 110 thus uses cracked hydrogen gas as a fuel, and this gas is supplied from the cracking or chemical dissociation process that takes place in the boiler-reactor. Burning of the hydrogen gas within the cylinders of the internal combustion engine 194 produces nonpolluting products of combustion (namely, water). The nitrogen gas supplied with the hydrogen from the cracking process, along with the nitrogen in the outside air entering the carburetor 195, does not recombine with the oxygen or hydrogen in the combustion process in the engine 194 and the exhaust gases pass out the stack 140 without appreciable pollutants therein as the nitrogen remains uncombined, and no oxides of carbon are present.

For initially starting the heat engine 110, a hydrogen and nitrogen storage and supply tank 182 is provided and this tank is supplied from the separator to carburetor conduit 172 through a branch conduit 176, a check valve 178, and a pump 180, which is controlled by a pressure sensor 184 in the tank. When needed, gas passes from the tank through a constant pressure regulator valve 186 and a check valve 188 and a branch conduit 190 back into the supply conduit 172 to the carburetor 195.

It will thus be seen that the heat engine 110 provides additional power by means of an internal combustion engine 194 and yet is pollution-free in that the exhaust gases passing through the stack 140 contain no oxides of carbon or nitrogen. It has been calculated that the heat engine 110, operated as described, witll produce a thermal efficiency of 51.8 percent, which is considerably higher than available from present day internal combustion engines.

The engines 10 and 110 operate on partially closed cycles in that a portion of the working fluid (namely, the water) is retained in a closed cycle and is used over and over again. A portion of the cracked or chemically dissociated gases of nitrogen and hydrogen available from the ammonia are burned and pass out through the exhaust stack 140 into the stmosphere while some of this gas is maintained in the tank 182. The heat engine 110 operates on a cycle similar to the Rankine cycle for steam and, while the engine is in some instances like a steam or noninternal combustion engine, an internal combustion engine process is combined therein to provide a very high thermal efficiency. Both engines 10 and 110 have the advantage of being substantially pollution-free in terms of carbon oxides and oxides of nitrogen.

Referring now, more particularly, to FIG. 3, therein is illustrated another embodiment of a heat engine constructed in accordance with the features of the present invention and referred to generally by the reference numeral 210. In the heat engine 210, ammonia is supplied from a high pressure storage tank 212 through a storage tank pressure regulator valve 214, a check valve 216, and a conduit 218 to the inlet side of a high pressure pump 230. The pump 230 increases the pressure of the working fluid, which consists only of ammonia, from approximately 40 psia at the output of the regulator valve 240 to approximately 500 psia, and the temperature is increased from ambient temperature of 70° to approximately 150°, after passage through the pump. The pump supplies high pressure working fluid via a conduit 228 to a cooling jacket 292 of an internal combustion engine 294 having a rotating crankshaft 250 and a plurality of pistons therein connected to the shaft by connecting rods, in the customary manner.

After passing through the cooling jacket 292, wherein the cylinder walls of the engine are cooled, the working fluid, at a pressure of approximately 500 psia and a temperature of approximately 200° F., passes through a conduit 296 into a boiler-reactor vessel 232 and flows through a heat exchange coil 234 therein. The boiler-reactor vessel includes an insulating housing 236 and includes an exhaust stack 240 for exhausting gas to the atmosphere. As the working fluid passes through the heat exchanger coil 234, the temperature and pressure are elevated to a level whereat cracking of the ammonia or chemical dissociation of the ammonia into nitrogen and hydrogen gas takes place. The high temperature working fluid leaving the heat exchager coil 234 is directed through a divider or tee-fitting 235 and flows to a storage tank 282 via a conduit 272, a check valve 178 and a fluid pump 280, or to a carburetor 295 of an internal combustion engine 294. A hydrogen and nitrogen gas storage tank 282 provides a standby source of fuel for the engine 210, and the gas is drawn from the tank when needed through a constant pressure regulator valve 286, a check valve 288, and a conduit 290 into a carburetor 295. After the engine is initially started and in operation, most of the fuel in the form of gaseous hydrogen is supplied directly to the carburetor through the line 242 from the tee-fitting 235.

In the carburetor, hydrogen fuel is mixed with air and the combustible mixture is introduced into the cylinders of the internal combustion engine 294 through an intake manifold system 297. The exhaust products of combustion from the engine contain mainly water and gaseous nitrogen, and these gases are delivered via an exhaust manifold system 298 into the boiler-reactor 232 through an inlet opening 236*a* for heating the working fluid in the coil 234. The high temperature products of combustion from the engine 294 heat the working fluid passing through the heat exchanger coil 234 to a level sufficient to crack the ammonia into nitrogen and hydrogen.

The heat engine 210 of the present invention uses ammonia as a fuel and in the boiler-reactor 232, the ammonia is cracked or chemically dissociated into gaseous nitrogen and hydrogen. The hydrogen provides a source of fuel for starting and running the engine, which is substantially pollution-free because the gases passing out the stack 240 do not contain oxides of nitrogen or carbon, but merely water and gaseous nitrogen.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In combination a heat engine using a working fluid containing ammonia and water, first means for elevating the temperature and pressure of said fluid to a level sufficient to vaporize the fluid whereat chemical dissociation of said ammonia into nitrogen and hydrogen gas takes place, second means for separating said nitrogen and hydrogen gas from said water, and third means for burning at least a portion of said separated dissociated hydrogen gas to supply part of the heat required by said first means.

2. A heat engine as set forth in claim 1 including work output means for expanding said vaporous working fluid after it has reached said elevated level of pressure and temperature in said first means.

3. The heat engine of claim 2 wherein said second means includes means for cooling said working fluid to condense said water into liquid form after expansion in said work output means to separate the water from said dissociated nitrogen and hydrogen gas.

4. The heat engine of claim 1 wherein said first means includes pump means for elevating the pressure of said fluid and boiler-reactor means for elevating the temperature of said fluid to said level sufficient to vaporize said fluid and produce chemical dissociation of said ammonia therein.

5. The heat engine of claim 4 including means for driving said pump means from said work output means.

6. The heat engine of claim 4 wherein said third means comprises internal combustion engine means.

7. The heat engine of claim 6 wherein said boiler-reactor means is heated from exhaust gases of said internal combustion engine means.

8. The heat engine of claim 6 including work output means for expanding said working fluid after said fluid is in vapor phase at said elevated pressure and temperature level in said first means.

9. The heat engine of claim 8 including condenser means for cooling said working fluid after expansion in said work output means to condense said water into liquid form without condensing said nitrogen and hydrogen into liquid form.

10. A heat engine using a working fluid which includes ammonia and water comprising pump means for pressurizing said fluid, heating means for elevating the temperature of said pressurized fluid to a level sufficient to vaporize the fluid whereat dissociation of said ammonia into nitrogen and hydrogen gas takes place, expander means for converting energy from said vaporized fluid into mechanical work, condenser means for cooling said expanded fluid to condense the water thereof into liquid form, and separate the same from said dissociated gases and means supplying said separated dissociated gases as fuel for said heating means.

11. The heat engine of claim 10 including internal combustion engine means, carburetor means for supplying a combustible mixture to said engine means, means supplying said dissociated gases to said carburetor means.

12. The heat engine of claim 10 including an exhaust system for said internal combustion engine means supplying heated exhaust gases therefrom to said heating means.

13. The heat engine of claim 12 including heat exchange means for cooling said internal combustion engine means and thereby preheating said working fluid prior to entry of said fluid into said heating means.

14. A heat engine using a mixture of ammonia and water as a working fluid comprising, fluid supply means, pump means for elevating the pressure of said fluid, heating means for elevating the temperature of ammonia of said fluid received from said pump means to a level sufficient to vaporize the same whereat chemical dissociation of said ammonia into nitrogen and hydrogen gas takes place, means for separating said dissociated gases from said water, internal combustion engine means including carburetor means for using said dissociated gas as a fuel and exhaust means for supplying heat for said heating means.

15. The heat engine of claim 14 including storage tank means for containing said gas not used in said carburetor means of said internal combustion engine.

16. A heat engine utilizing a working fluid comprising a mixture of water and ammonia, comprising means for injecting makeup ammonia into said water at a first stage, pump means for elevating the pressure of said fluid from said first stage to a higher level, boiler means for elevating the temperature of said fluid received from said pump means to a higher level sufficient to vaporize said fluid and chemically dissociate the nitrogen and hydrogen of said ammonia, expander means for extracting work from fluid received from said boiler means as the fluid is expanded to a lower pressure, condenser means for cooling fluid received from said expander means to condense the water of said fluid into liquid form while leaving said nitrogen and hydrogen in gaseous form, and separator means for removing said gaseous nitrogen and hydrogen prior to return of said water to said first stage.

17. The heat engine of claim 16 wherein said boiler means includes burner means for heating said fluid, said burner means including means for oxidizing at least a portion of said hydrogen gas removed from said working fluid by said separator means.

18. The heat engine of claim 17 wherein said separator means includes a pressure tank for receiving and holding said gas removed from said fluid for supply to said burner means.

19. A method of doing work comprising the steps of forming a working fluid of ammonia and water, elevating the temperature and pressure of said fluid to vaporize the same and chemically dissociate the ammonia into hydrogen and nitrogen, expanding said fluid to do work while lowering the pressure thereof, cooling said expanded fluid to condense the water into liquid form while said nitrogen and hydrogen remain in gaseous form, removing at least a portion of the gaseous hydrogen from said fluid and oxidizing the same to supply heat for elevating the temperature of said fluid to vaporzie the same.

20. The method of claim 19 including the steps of storing said hydrogen and nitrogen gases separated from said working fluid and metering at a controlled rate the flow of said stored gases to be oxidized to thereby control the heat supplied for elevating the temperature of said fluid.

21. The method of claim 19 including the step of metering said vaporized fluid at a controlled flow rate for expansion to thereby control the rate of work output therefrom.

22. The method of claim 19 wherein said forming step comprises intermixing of ammonia and liquid water to a selected concentration.

23. A heat engine operable with a working fluid having at least two components which undergoes a chemical change during each cycle of operation through a circulating system, comprising boiler means for elevating the heat value of said fluid to vaporize the same and cause chemical dissociation of at least one component therein into a combustible gas and another gas, expander means receiving said fluid from said boiler means for extracting work therefrom during expansion thereof from high to low pressure, condenser means for cooling said fluid to condense another component of said fluid into liquid form and retain said gases in vapor form, separator means for removing said gases from said fluid for combustion of said combustible gas, and fluid makeup means for supplying said one component to said fluid to make up for the amount lost by chemical dissociation of the same prior to recirculation of said fluid through said boiler means.

24. The heat engine of claim 23 wherein said boiler means includes a burner for oxidizing said combustible gas for providing heat energy to vaporize said fluid and cause said chemical dissociation.

25. The heat engine of claim 24 including storage means for holding said gases separated from said fluid by said separator means and means for supplying said gases at a controlled rate to said burner means for combustion.

26. The heat engine of claim 23 including pump means receiving said fluid from said fluid makeup means for elevating the pressure of said fluid delivered to said boiler means.

27. The heat engine of claim 26 including drive means interconnecting said expander means and said pump means for driving the latter from the former.

28. The heat engine of claim 23 including throttle valve means for controlling the flow of vaporized fluid from said boiler means into said expander means for controlling the work output of said engine.

29. The heat engine of claim 9, wherein said noncondensed hydrogen from said cooling means is mixed with oxygen from the air and burned to provide at least a portion of the heat for said boiler-reactor means.

* * * * *